(No Model.)
S. STEPHENS & D. B. HANSON.
BAND SAW GUIDE.
No. 334,818. Patented Jan. 26, 1886.
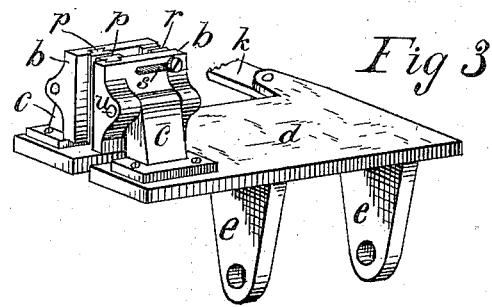
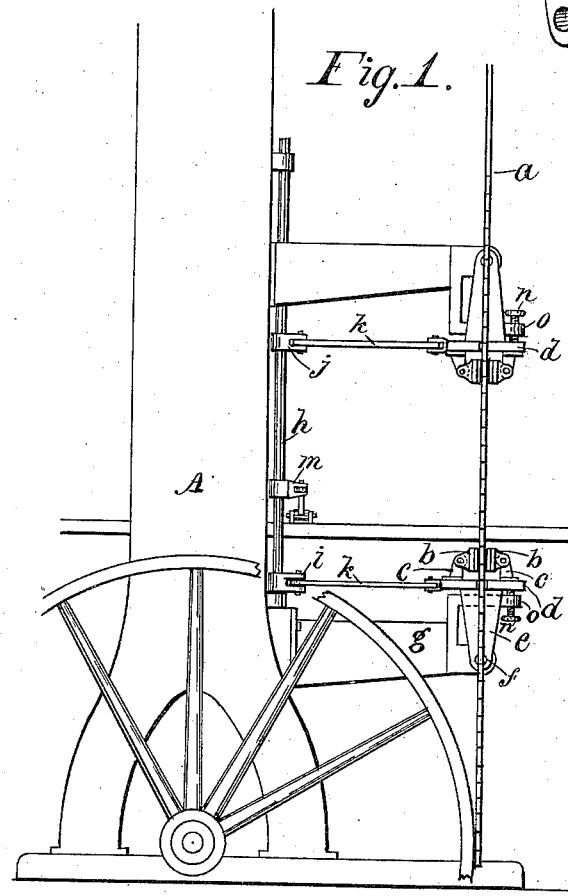
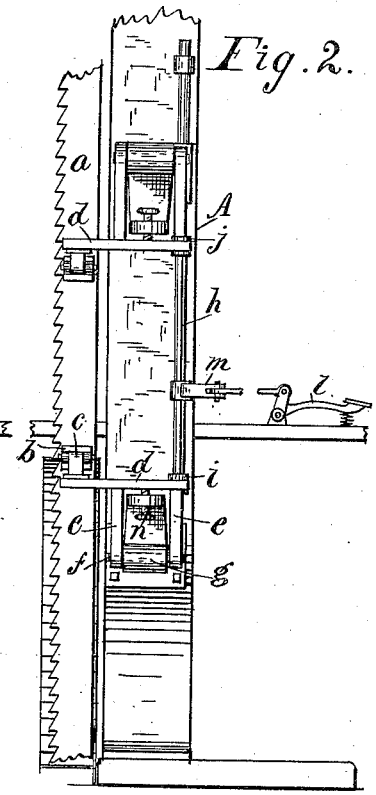
WITNESSES:
Frank A. Jacob,
V. M. Hood.
INVENTORS:
Samuel Stephens
Dempsey B. Hanson
By H. P. Hood
Atty.

UNITED STATES PATENT OFFICE.

SAMUEL STEPHENS AND DEMPSY B. HANSON, OF INDIANAPOLIS, INDIANA.

BAND-SAW GUIDE.

SPECIFICATION forming part of Letters Patent No. 334,818, dated January 26, 1886.

Application filed May 4, 1885. Serial No. 164,319. (No model.)

*To all whom it may concern:*

Be it known that we, SAMUEL STEPHENS and DEMPSY B. HANSON, citizens of the United States, residing at Indianapolis, in the county of Marion and State of Indiana, have invented a new and useful Improvement in Band-Saw Guides, of which the following is a specification.

Our invention relates to an improvement in the guides in a band-saw mill, which embrace the saw on each side, above and below the log.

The object of our improvement is to deflect the saw from the path of the timber, and thereby prevent the saw from coming in contact with the log while it is running back preparatory to making a new cut, and to prevent the guides from cramping the saw when it is deflected, all as hereinafter described.

The accompanying drawings illustrate our invention.

Figure 1 represents a front elevation of a band-saw mill with our improved saw-guide. Fig. 2 is a side elevation. Fig. 3 is a perspective view, on a larger scale, of the saw-guide.

The saw $a$ is embraced between a pair of vertical guide-plates, $b\ b$, which engage the saw on opposite sides. Said guide-plates are mounted upon a swinging support, which is pivoted so as to swing in a horizontal plane to an arm, $g$, forming a part of the frame which supports the saw. Said support consists of a plate, $d$, having lugs $e\ e$, through which the pivot-bolt $f$ passes, connecting said lugs to the arm $g$. Two guides are provided, each consisting of a pair of plates, $b\ b$, mounted on a plate, $d$, pivoted to an arm projecting from the main frame A, one set of guides being above and the other below the log to be sawed. Said guides are caused to swing simultaneously toward and from the standard by means of a vertical shaft, $h$, mounted in suitable bearings on the main frame, and short arms $i$ and $j$ secured to said shaft so as to rotate with it. The lower arm, $i$, is rigidly secured to the end of the shaft, and the upper arm, $j$, is preferably arranged to slide along the shaft, so as to permit of the vertical adjustment of the upper set of guides. Arms $i$ and $j$ are connected with plates $d$ by means of connecting-rods $k\,k$.

Shaft $h$ is turned in its bearings by means of a suitable lever, as $l$, within convenient reach of the sawyer, and connected with a lever, $m$, secured to the shaft. A set-screw, $n$, in a horizontally-projecting flange, $o$, formed integral with or attached to the guide-supporting arms, forms an adjustable stop which limits the outward oscillations of the plates $d$ and their guides $b\ b$.

The operation of our device is as follows: The sawyer rotates shaft $h$ by means of lever $l$, or other suitable means, so as to turn arms $i$ and $j$ outward, the arrangement being such that when plates $d$ come in contact with the stops $n$ the arms $i$ and $j$ will have attained their limit of outward movement, thus bringing the centers of the connecting-pivots at each end of the rods $k$ and the center of shaft $h$ in line. This movement brings the saw into position for cutting, and securely locks the guides, so as to prevent an accidental deflection of the saw from its path when sawing. When the cut has been completed, the sawyer, before gigging back the log-carriage, turns shaft $h$ so as to swing arms $i$ and $j$ toward the frame A, thus swinging plates $d$ and their guides inward and drawing the saw away from the cut surface of the log. The guide-plates $b\ b$ are flexibly connected with the standards $c\ c$ by a hinge at $u$, instead of rigidly, for the purpose of allowing the guides to adjust themselves to the changing positions of the saw, so as to prevent any kinking or cramping of the saw.

For the purpose of avoiding unnecessary friction on the saw guide-plates are usually faced with pieces of wood next the saw, of sufficient width to engage nearly the entire width of the widest saws that may be used on the mill.

In our guides we reduce the friction on the saw, and adapt the guides to saws of different widths by the construction shown in Fig. 3. A narrow strip of wood or metal, $p$, is permanently secured to the inner face of each of the guide-plates, near the front edge of the saw, and a second narrow piece of wood or metal, $r$, is secured to the guide-plate by means of screws passing through slots $s$ in the plate, so that piece $r$ may be adjusted laterally on the guide-plate, so as to bear on the saw near the back edge thereof, whether the saw be narrow or wide.

We are aware that guides embracing the saw and rigidly connected to a movable support which has a sliding movement on the saw-frame, said movement being controlled by cams and springs, have before been used, and do not claim such a device. The disadvantages of such a construction are that the proper fitting of the sliding support to the frame is difficult and expensive. It is not positively controlled or rigidly held in position by the cam and spring, and the saw, when drawn away from the log, is very liable to be broken by reason of the rigid connection of the guide-plates with their movable support. These difficulties we avoid by our improved construction.

We claim as our invention—

1. In a band sawing machine, the combination, with the saw, a frame on which the saw is mounted, and a pair of guide-plates between which the saw is embraced, of a support for said guide-plates pivoted to the frame and arranged to oscillate thereon, and means for controlling said oscillation, whereby the saw is held rigidly in the line of cut and deflected therefrom, substantially as and for the purpose specified.

2. In a band sawing machine, the combination, with the saw, and a frame on which the saw is mounted, having two arms, one above the other, of two pairs of guide-plates and two supports for said guide-plates, said supports pivoted, respectively, to said arms, so as to oscillate thereon, and means, substantially as shown and described, for oscillating said supports simultaneously.

3. In a band-sawing machine, the combination, with the saw, the standard on which the saw is supported, and a movable guide-support arranged to move toward and from said standard, of the pair of short standards $c\ c$, erected on said guide-support, and guide-plates $b\ b$, arranged to embrace the saw between them and hinged to said short standards, substantially as and for the purpose specified.

4. In a band sawing machine, the combination, with the upper and lower guides mounted on bases which are pivotally connected with upper and lower supporting-arms, of the vertical shaft $h$, having arms $i$ and $j$, connecting-rods $k\ k$, and mechanism, substantially as shown and described, whereby said shaft may be rotated and the guide-bases oscillated simultaneously.

SAMUEL STEPHENS.
DEMPSY B. HANSON.

Witnesses:
A. DICKERMAN,
A. K. DAME.